United States Patent Office 3,089,897
Patented May 14, 1963

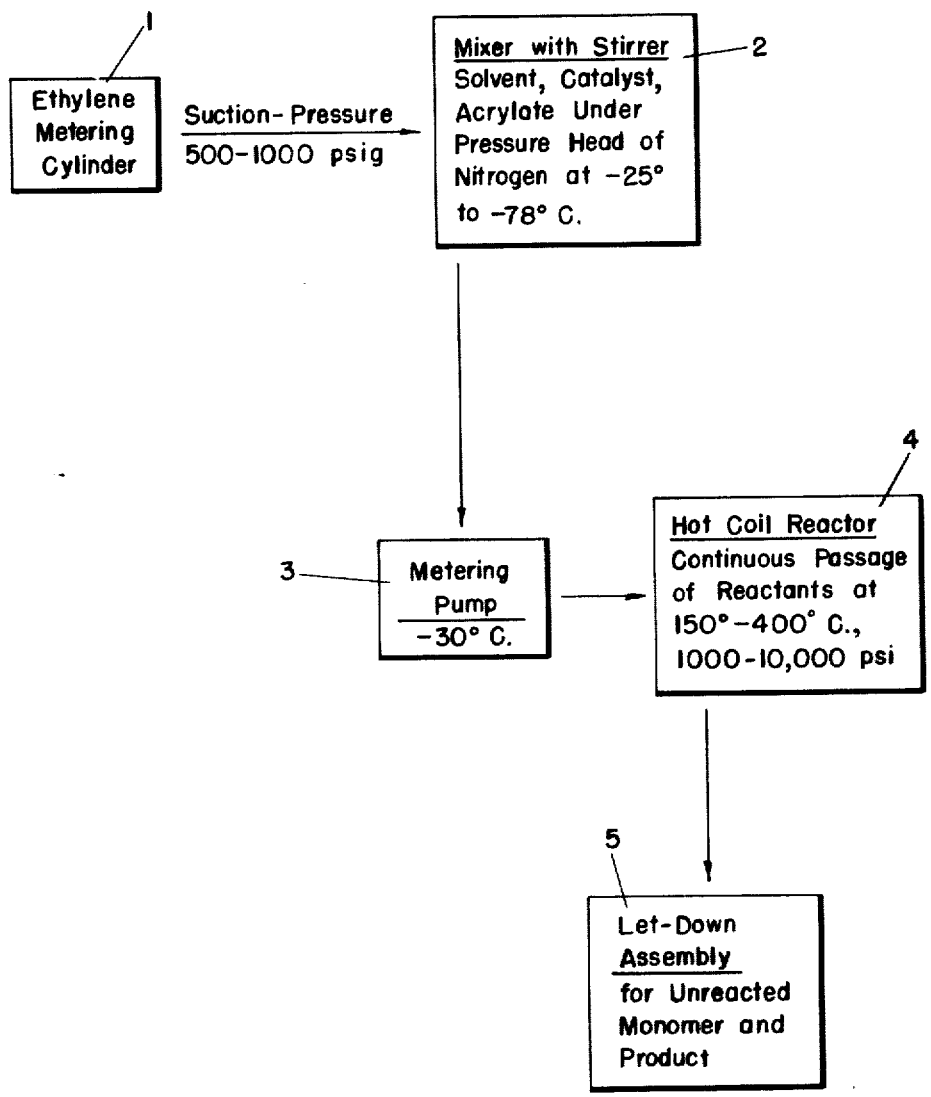

3,089,897
COPOLYMERIZATION OF ETHYLENE WITH ALKYL ACRYLATES OR METHACRYLATES
Clifford E. Balmer, Holland, Clarence A. Brown, Hatboro, and Melvin D. Hurwitz, Southampton, Pa., and James E. Masterson, Moorestown, N.J., assignors to Rohm & Haas Company, Philadelphia, Pa., a corporation of Delaware
Filed June 16, 1959, Ser. No. 820,625
16 Claims. (Cl. 260—486)

This invention relates to the copolymerization of monovinyl unsaturated hydrocarbons with derivatives of acrylic and methacrylic acids. For convenience of reference, hereinafter, the term "acrylates" will be used so as interchangeably to identify the esters of acrylic and methacrylic acid, both unsubstituted and substituted, unless one or the other is more specifically named.

The primary objects of this invention are to provide an improved process for copolymerizing ethylene and an acrylate, and thereby to provide improved organic compounds which are useful in many applications, such as plasticizers for vinyl type compositions, as lubricants, etc.

Various methods for copolymerizing ethylene and acrylates, and the various products thereof, have been known to the prior art. Examples of such previously known procedures and products are disclosed in such references as U.S. Patent 2,200,429 and British Patents 579,884 and 703,252. In all the known prior art methods, however, the copolymerizations invariably have taken relatively long periods of time, even though the conversion to the copolymers have been made under relatively high pressures and temperatures with the benefit of the best free radical initiators and catalysts known to the art.

The present invention constitutes an important improvement over the previously known methods by making possible the use of less stringent reaction conditions, but most important of all because it makes possible the completion of the actual copolymerization phase of the process within a much shorter time than has heretofore been capable of accomplishment. The most significant feature of this last-named advantage is that, not only is the time of the entire operation reduced, but also, and even more important, the critical reaction time (hereinafter also referred to as "dwell time") is extremely short; in fact, it may be as low as 0.5 minute but in any event will not exceed 30 minutes. This factor makes it possible to reduce greatly and even eliminate the undesirable side reactions and degradations which generally result when ethylene and an acrylate are copolymerized under high pressures and temperatures for relatively long periods of reaction time.

In addition to the greater efficiency and simplicity of our new process, the aforesaid limiting of degradative and other side reactions tends to provide better products without requiring additional purification steps. Another advantage resides in the fact that the process makes possible higher conversions and yields than have heretofore been attainable.

The process of the present invention can best be understood by reference to the accompanying drawing which is a schematic representation illustrative of the equipment which may be employed. In the drawing, it will be seen that the principal elements of the apparatus consist of a source of ethylene gas which can be metered accurately, such as a metering gas cylinder 1; a mixer 2 in which all of the reactants can be combined and stirred (cooling means for the mixer is desirable); a controlled-volume metering pump 3 for feeding the mixture of reactants into the reactor; a hot coil reactor 4 capable of withstanding pressures of 10,000 p.s.i.; and a receiver or let-down assembly 5 for collecting the unreacted monomer and product.

Metering cylinder 1, autoclave 2, and metering pump 3 are well-known, commercially available pieces of apparatus. The coil reactor can take any of numerous convenient forms. In the examples described below, the coils employed were constructed of either ¼ inch standard high pressure, or ³⁄₁₆ inch Ermeto tubing with such lengths as to provide a volume of 8, 20, or 40 ml. Each reactor was equipped with several conveniently spaced thermocouples at different points throughout the length of the coil to measure the temperature therein. The let-down assembly 5 consists of three main components: a pneumatic control element operated from a convenient air supply (at around 20 p.s.i.); a transducer (sensor) element which converts the impulses from the high pressure system to a signal which activates the control element; and a back pressure valve which actually maintains the pressure or vents to the atmosphere, as dictated by the pneumatic control via the transducer. All three of these components of the let-down system are items of commerce which are readily available.

The method of our invention may be generally described most conveniently, by reference to the drawing, as follows. The mixer 2 and the metering pump 3 are cooled to about −30° C. by pumping acetone, which has been cooled with Dry Ice, around them. The reactor coil 4 is maintained in a heating bath of silicone oil or fused salts, which is warmed by means of a thermoregulated heater to the desired temperature. The ethylene metering cylinder is filled from a suitable supply source and allowed to attain temperature equilibrium, about 25° C., by means of a thermostatically controlled water bath. The mixer 2, a pressure-resistant vessel, is placed under suction so as to be well evacuated, and the ethylene is then charged thereinto. The pressure drop is measured in order to calculate the number of moles which are thus introduced. The other reactants, the acrylate, catalyst, and solvent, if any, are placed into a charging cylinder (not shown in the drawing), and then forced into mixer 2 with nitrogen under pressure which normally does not exceed 500 p.s.i. The contents of the mixer are then agitated for at least 2 minutes, after which the stirring may be stopped.

The particular arrangement of the apparatus hereinabove described, and illustrated in the drawing, is merely typical of one convenient manner in which the present invention may be practiced. Actually, many variations thereof will suggest themselves to persons skilled in the art with which the invention is concerned. For instance, the metering cylinder and the mixer may be replaced by a device which feeds two or more streams into a metering pump in such a manner that the separate streams are thoroughly mixed prior to their introduction into the hot coil reactor.

The metering pump 3 is started and the desired pressure is developed in a few minutes. The reaction mixture passes through the coil reactor 4 where it stays, under a pressure of at least 1,000 p.s.i. and a temperature of between about 150° and 400° C., for a period of between 0.5 and 30 minutes, but preferably between 2 and 20 minutes.

The mixture is allowed to vent through the back pressure valve as the desired pressure is reached, and from this point on the valve continually opens and closes so as to vent both liquid and gas. In no event should the pressure be permitted to exceed 10,000 p.s.i. The liquid is collected in a modified fraction cutter and the gases are led through a wet test meter. The data usually recorded during a run are the temperatures at the thermocouples, the wet test meter reading, the rate of collection of the condensed phase, the pressure at the back pressure valve, and temperatures of the cooling bath (normally about −30° C.).

The liquid product is stripped of volatiles by heating, usually under vacuum, in a simple overhead take-off distillation apparatus. The final conditions of temperature and pressure in this step are dependent upon the end use visualized for the product. For example, stripping at about 200° C. at about 1 mm. pressure is suited to the procurement of many products useful as plasticizers. It is the residue from this distillation which is used for calculations of yields and conversions and for physical and analytical data. The analytical data include a determination of carbon content for the purpose of calculating the ratio of ethylene to acrylic monomer in the copolymer.

Optionally there may be employed in the reaction an initiator of the conventional free-radical type, for example, ditertiary butyl peroxide or tertiary butyl peracetate. When such initiators are employed, they are present in amounts up to 20 mole percent based on total moles of monomers. A preferred range for the use of such initiators is 1–5 mole percent. Although useful products can be obtained without the use of an added initiator, higher conversions result when a free-radical initiator is employed.

A diluent such as cumene, hexane, or methyl isobutyl ketone, may also be included in the reaction in order to moderate the reaction exotherm and impart fluidity to the reaction mixture. When such diluents are utilized, they normally should not exceed 200 weight percent based on the amount of the acrylic monomer. Under certain extreme conditions of temperature, pressure and/or catalyst concentration, side reactions and degrading reactions which may occur despite the brief dwell time may be effectively prevented by the addition of small amounts of such diluents.

The products which are obtained from the process of our invention are characterized by their exceptionally low molecular weight for the types of copolymers involved, and they are fluid materials. As stated above, they are marked by the essential absence of side reaction products or degradation products. A further factor which contributes to the superiority of the compositions of the present invention, in comparison with ethylene-acrylate copolymers which have heretofore been known, may be attributed to the fact that chain regulators have not been used in their preparation. The products may generally be defined in the following terms:

(1) Molecular weight (ebulliometric); ranging between 500 and 1500
(2) Viscosity ranges from H to $Z_5$ on the Gardner-Holdt scale (equivalent to 2–98.5 poises)
(3) Light color (characteristically 1, but in any event no more than 3, on the Gardner 1933 scale)
(4) Acid numbers generally below 1, but in any case no more than about 3.0
(5) Molar ratio of ethylene to acrylic monomer ranging from 1.0 to 3.0, depending on the acrylic monomer employed. The upper limit is a function of molecular weight, as expressed by the equation:

Moles of ethylene/mole of acrylic monomer $$= X + \frac{1}{4}\left(\frac{1500}{\text{molecular weight}}\right)$$

where $X=1.75$ for ethyl acrylate and methyl methacrylate and $X=2.25$ for methyl acrylate.

The broad and preferred ranges of the molar ratios of ethylene to the acrylic monomer, and the molecular weight of the product obtained by any pair of the two, can conveniently be ascertained from Table I which follows:

TABLE I

|  | Ethylene-acrylate mole ratio in product | Molecular weight |
|---|---|---|
| Methyl acrylate: |  |  |
|   Broad range | 1.0–3.0 | 500–1,500 |
|   Preferred range | 1.7–2.2 | 700– 900 |
| Ethyl acrylate: |  |  |
|   Broad range | 1.0–2.5 | 500–1,500 |
|   Preferred range | 1.3–2.0 | 700– 900 |
| Methyl methacrylate: |  |  |
|   Broad range | 1.0–2.5 | 500–1,500 |
|   Preferred range | 2.0–2.5 | 500– 800 |

Characteristically, the higher the amount of ethylene which is incorporated in the copolymer product, the lower must be the molecular weight for the material. Thus, in the copolymer formed from ethylene and methyl acrylate, an average molecular weight of about 500 is suitable for a composition in which the mole ratio of ethylene to methyl acrylate is 3.0; but this mole ratio must be reduced to 2.25 as an average molecular weight of 1500 is approached. Recognition of these critical elements of the invention is made in the simple formula given above which relates the permissible upper limit of ethylene content to the molecular weight.

For certain applications, the products obtained by the present invention can be given additional superior performance properties if the acidity of the resultant copolymers is kept low, for example, no more than an acid number of 3.0. This is exceptionally useful when the product is employed in lubricants and as a plasticizer for such materials as polymers which are incorporated in electrical insulation and the like. In such usages, a low acid number is necessary (1) to keep undesirable corrosive acids out of lubricants as much as possible, and (2) to obtain high volume resistivity when the plasticized product is used as an electrical insulator.

Table II, and the examples which follow, well illustrate the manner of operation of the present invention which has been described only in general terms above. Table II, which actually is a summary of the examples, lists the acrylate comonomers which are polymerized with ethylene in each case, the catalysts and diluents, if any, which may have been employed, the various reaction conditions, and a description of the products in terms of the ethylene:acrylate ratio, the molecular weight, and the viscosity of each.

The column headed "Dwell Time" in Table II, represents the critical reaction time in minutes. The dwell time, as mentioned above, is the time that the reactants are present in the coil reactor and actually are undergoing copolymerization. For purposes of illustration, it will be noted that the total running time of the entire process was 108 minutes and a total of 373 grams of liquid product was obtained. If the time is divided into the weight of product obtained, the result is 3.46 grams/minute. Assuming that the specific gravity of the product is about 1, we can consider this figure to be 3.46 ml./minute. The volume of the coil reactor used in Example 1 was 8 ml. Upon dividing this volume by 3.46 ml. per minute, we obtain the length of time the reactants actually were in the coil. This time, which was 2.3 minutes, is what is meant by "dwell time."

By way of further explanation concerning the dwell time, it should be observed that, as the components enter the coil reactor, they are all liquid. When the product of those reactants comes out at the other end of the coil reactor, it is also a liquid. However, the measurement of the liquid obtained does not include the unreacted ethylene which has been volatilized. Therefore, in Example 1 just referred to, there actually was more than 3.46 ml./minute of materials which went into and through the coil reactor. If this larger number were divided into the volume of the coil reactor, the result would be a dwell time which actually is less than what is reported in Table II and in the examples below. Thus, the dwell times herein reported, although considerably less than the actual reaction times of corresponding copolymerizations known to the prior art, actually represent maxima; in fact, they are even less than the relatively low periods of time which have been indicated.

It will be obvious that when the process of this invention is practiced on a larger scale, as contemplated for a continuous, commercial operation, the hot coil reactor will have a volume many times that of the 8, 20, or 40 ml. tubes used in the following examples. As the capacity of the tube is increased, there will be an accompanying lessening of the total time needed for processing a given quantity of ethylene and acrylate since a larger quantity of the monomers can be fed into the coil reactor per unit of processing time. Of course, regardless of tube diameter size or length, or the rate at which the monomers are fed through the reactor, the critical dwell times will remain substantially unchanged. Naturally, the productivity will increase as the capacity of the reactor is enlarged.

sure; and the residue from this distillation may be described as follows:

Viscosity at 25° C. (Gardner-Holdt) _____ T–(5.5 poises).
Molecular weight _____ 629±4.
Ethylene (E) to methyl acrylate (MA) mole ratio _____ 2.72/1.0.
Yield (based on analysis of product) _____ 55.0%.
Acid number _____ 0.5.
Color _____ 1 (Gardner 1933 scale).

*Example 2*

Charge: Grams
   Ethyl acrylate (EA) _____ 300
   Ethylene (E) _____ 420
   75% t-butyl peracetate _____ 63.4

Process: That of Example 1 except at a bath temperature of 200° C.; also, the coil reactor used had a volume of 40 ml. Running time was 135 minutes, and 208 g. of crude liquid product was obtained.

TABLE II

| Ex. | Comonomers | Dwell time, min. | Temp., °C. | Pressure, p.s.i. | Catalyst (mole percent) | Diluent (weight percent on acrylate) | Product mole ratio, ethylene/acrylate | Molecular weight | Viscosity at 25° C. G.H. | P. (approx.) | Acid number |
|---|---|---|---|---|---|---|---|---|---|---|---|
| 1 | MA | 2.3 | 250 | 5,000 | TBPAc (2) | Cumene (25) | 2.72 | 629 | T– | 5.5 | 0.5 |
| 2 | EA | 2.6 | 200 | 5,000 | TBPAc (2) | None | 1.97 | 746 | R+ | 4.7 | 0.8 |
| 3 | MMA | 2.6 | 250 | 5,000 | TBPAc (2) | Cumene (50) | 1.75 | 670 | $Z_5$– | 98.5 | 0.5 |
| 4 | EA | 20 | 250 | 2,500 | TBPAc (2) | None | 1.00 | 878 | Y– | 17.6 | 0.4 |
| 5 | MA | 3.4 | 150 | 5,000 | TBPAc (2) | ___do___ | 1.44 | 664 | Y | 17.6 | 0.8 |
| 6 | EA | 21.5 | 200 | 5,000 | TBPAc (0.82) | ___do___ | 1.10 | 1,290 | $Z_4$– | 63.4 | 1.5 |
| 7 | EA | 2.3 | 200 | 5,000 | TBPAc (2) | Cumene (100) | 1.34 | 959 | $Z_1$ | 27 | 0.5 |
| 8 | MMA | 2.5 | 290 | 5,000 | CuOOH (1) | ___do___ | 2.24 | 614 | Z– | 22.9 | 0.5 |
| 9 | EA | 18 | 200 | 5,000 | DDM (2) | None | 1.0 | 1,095 | $Z_3$– | 46.3 | 1.0 |
| 10 | EA | 2.3 | 290 | 5,000 | DTBP (1.3) | Hexane (50) | 1.97 | 663 | N– | 3.4 | 2.0 |
| 11 | MA | 2.5 | 200 | 5,000 | TBPAc (2) | Me prop. (20) | 1.74 | 649 | X+ | 12.9 | 0.5 |
| 12 | MA | 2.8 | 350 | 5,000 | DTBP (1) | Hexane (100) | 2.55 | 651 | W | 10.7 | 1.0 |
| 13 | MMA | 10 | 250 | 10,000 | TBPAc (2) | MIBK (42) | 1.90 | 500 | W+ | 10.7 | 1.0 |
| 14 | MA | 2.4 | 250 | 2,500 | TBPAc (4) | Me prop. (20) | 1.38 | 589 | Y– | 17.6 | 0.5 |
| 15 | EA | 3.7 | 200 | 5,000 | DTBP (1.5) | Hexane (50) | 1.73 | 915 | Y– | 17.6 | 0.8 |

NOTE.—MA=methyl acrylate; EA=ethyl acrylate; MMA=methyl methacrylate. Catalyst=catalyst or free-radical initiator in mole percent based on total monomers present. G.H.=Gardner-Holdt scale; P=poises; TBPAc=tertiary butyl peracetate; CuOOH=cumene hydroperoxide; DDM=methyl ethyl ketone peroxide; DTBP=di-t-butyl peroxide; MIBK=methyl isobutyl ketone; Me prop.=methyl propionate.

Following are the actual examples from which the data were obtained that is presented in Table II above. The detailed procedure employed in each example is set forth in Example 1. In the succeeding examples, the process employed is exactly the same, with certain few exceptions which are specifically mentioned in each instance.

*Example 1*

Ethylene, 525 g. (18.75 moles), was introduced to a chilled (–40° C.) reservoir from a cylinder of known volume. Methyl acrylate 215 g. (2.5 moles), t-butyl peracetate (75% in benzene), 74.8 g. and cumene, 53.75 g., were added to the reservoir; and these reactants were mixed with ethylene by stirring. The reservoir contents were pressurized to 500 p.s.i.g. with nitrogen, and the entire reaction mixture was metered by means of a high-pressure proportioning pump into a coil reactor of 8 ml. volume. The latter was immersed in a constant temperature bath held at 250° C. The reaction pressure in the hot coil was 5,000 p.s.i.g. and was maintained by a high-pressure let-down valve and control system. The rate of feed of reactants was so adjusted that the effluent from the hot coil was collected (via the let-down valve) at about 3 ml. of condensed phase per minute; gaseous effluent was permitted to escape to the atmosphere. The total running time was 108 minutes and a total of 373 g. of liquid product was obtained. This material was stripped of volatiles by heating it to 200° C. at about 1 mm. pressure Product:
   Viscosity _____ R+
   Molecular weight _____ 746
   Mole ratio of E/EA _____ 1.97
   Yield, percent _____ 74
   Acid number _____ 0.8
   Color _____ 1–

*Example 3*

Charge: Grams
   Methyl methacrylate (MMA) _____ 250
   Ethylene _____ 525
   Cumene _____ 125
   75% t-butyl peracetate _____ 74.8

Process: That of Example 1. Running time was 156 minutes and 480.3 g. of crude product was obtained Product:
   Viscosity _____ $Z_5$–
   Molecular weight _____ 670
   Mole ratio of E/MMA _____ 1.75
   Yield, percent _____ 59.0
   Acid number _____ 0.5
   Color _____ 1+

*Example 4*

Charge: Grams
   Ethyl acrylate _____ 300
   Ethylene _____ 420
   75% t-butyl peracetate _____ 63.4

Process: That of Example 2 except at a reaction pressure of 2500 p.s.i.g. Running time: 176 minutes. Crude product: 357 g.

Product:

| | |
|---|---|
| Viscosity | Y− |
| Molecular weight | 878 |
| Mole ratio of E/EA | 1.00 |
| Yield, percent | 67.6 |
| Acid number | 0.4 |
| Color | 1− |

*Example 5*

Charge:

| | Grams |
|---|---|
| Methyl acrylate (MA) | 258 |
| Ethylene (E) | 252 |
| 75% t-butyl peracetate | 42.3 |

Process: That of Example 1, except at a bath temperature of 150° C. Running time: 158 minutes. Crude product: 373 g.

Product:

| | |
|---|---|
| Viscosity | Y |
| Molecular weight | 661 |
| Mole ratio of E/MA | 1.44 |
| Yield, percent | 72.0 |
| Acid number | 0.8 |
| Color | 1+ |

*Example 6*

Charge:

| | Grams |
|---|---|
| Ethyl acrylate (EA) | 300 |
| Ethylene (E) | 336 |
| 75% t-butyl peracetate | 21.2 |

Process: That of Example 2. Running time: 180 minutes. Crude product: 335 g.

Product:

| | |
|---|---|
| Viscosity | $Z_4$− |
| Molecular weight | 1290 |
| Mole ratio of E/EA | 1.10 |
| Yield, percent | 71.8 |
| Acid number | 1.5 |
| Color | 1− |

*Example 7*

Charge:

| | Grams |
|---|---|
| Ethyl acrylate (EA) | 300 |
| Ethylene (E) | 252 |
| Cumene | 300 |
| 75% t-butyl peracetate | 42.3 |

Process: That of Example 1 except at a bath temperature of 200° C. Running time: 185 minutes. Crude product: 652 g.

Product:

| | |
|---|---|
| Viscosity | $Z_1$ |
| Molecular weight | 959 |
| Mole ratio of E/EA | 1.34 |
| Yield, percent | 76.0 |
| Acid number | 0.5 |
| Color | 1 |

*Example 8*

Charge:

| | Grams |
|---|---|
| Methyl methacrylate (MMA) | 250 |
| Ethylene (E) | 350 |
| 75% cumene hydroperoxide | 30.6 |
| Cumene | 250 |

Process: That of Example 1, except at a bath temperature of 290° C. Running time: 237 minutes. Crude product: 619 g.

Product:

| | |
|---|---|
| Viscosity | Z− |
| Molecular weight | 614 |
| Mole ratio of E/MMA | 2.24 |
| Yield, percent | 58 |
| Acid number | 0.5 |
| Color | 1+ |

*Example 9*

Charge:

| | Grams |
|---|---|
| Ethyl acrylate (EA) | 252 |
| Ethylene (E) | 300 |
| Methyl ethyl ketone peroxide | 28 |

Process: That of Example 2. Running time: 167 minutes. Crude product: 370 g.

Product:

| | |
|---|---|
| Viscosity | $Z_3$− |
| Molecular weight | 1095 |
| Mole ratio of E/EA | 1.0 |
| Yield, percent | 78.8 |
| Acid number | 1.0 |
| Color | 1− |

*Example 10*

Charge:

| | Grams |
|---|---|
| Ethyl acrylate (EA) | 300 |
| Ethylene (E) | 420 |
| Di-t-butyl peroxide (97%) | 35.1 |
| Hexane | 150 |

Process: That of Example 1, except at a bath temperature of 290° C. Running time: 181 minutes. Crude product: 568 g.

Product:

| | |
|---|---|
| Viscosity | N− |
| Molecular weight | 663 |
| Mole ratio of E/EA | 1.96 |
| Yield, percent | 74 |
| Acid number | 2.0 |
| Color | 1− |

*Example 11*

Charge:

| | Grams |
|---|---|
| Methyl acrylate (MA) | 344 |
| Ethylene (E) | 560 |
| Methyl propionate | 68.8 |
| 75% t-butyl peracetate | 84.5 |

Process: That of Example 7. Running time: 178 minutes. Crude product: 579 g.

Product:

| | |
|---|---|
| Viscosity | X+ |
| Molecular weight | 649 |
| Mole ratio of E/MA | 1.74 |
| Yield, percent | 64.2 |
| Acid number | 0.5 |
| Color | 1+ |

*Example 12*

Charge:

| | Grams |
|---|---|
| Methyl acrylate (MA) | 215 |
| Ethylene (E) | 250 |
| Hexane | 215 |
| Di-t-butyl peroxide (97%) | 22.6 |

Process: That of Example 1, except at 350° C. Running time: 200 minutes. Crude product: 568 g.

Product:

| | |
|---|---|
| Viscosity | W |
| Molecular weight | 651 |
| Mole ratio of E/MA | 2.55 |
| Yield, percent | 72 |
| Acid number | 1.0 |
| Color | 3 |

*Example 13*

Charge:

| | Grams |
|---|---|
| Methyl methacrylate (MMA) | 50 |
| Ethylene (E) | 140 |
| Methyl isobutyl ketone | 21.3 |
| t-Butyl peracetate (75%) | 13.9 |

Process: Essentially that of Example 1, except that coil size was 20 ml. and the reaction pressure was 10,000 p.s.i.

Product:
  Viscosity _____ W+
  Molecular weight _____ 500
  Mole ratio of E/MMA _____ 1.90
  Yield, percent _____ 54
  Acid number _____ 1.0
  Color _____ 1

*Example 14*

Charge:                                    Grams
  Methyl acrylate (MA) _____ 344
  Ethylene (E) _____ 560
  Methyl propionate _____ 68.8
  75% t-butyl peracetate _____ 169

Process: That of Example 1, except at a reaction pressure of 2500 p.s.i.g. Running time was 183 minutes for 611 g. crude product.

Product:
  Viscosity _____ Y—
  Molecular weight _____ 589
  Mole ratio of E/MA _____ 1.38
  Yield, percent _____ 60
  Acid number _____ 0.5
  Color _____ 1—

*Example 15*

Charge:                                    Grams
  Ethyl acrylate (EA) _____ 300
  Ethylene (E) _____ 420
  Hexane _____ 150
  Di-t-butyl peroxide _____ 40.6

Process: That of Example 1, except at a bath temperature of 200° C. Also, the product was stripped to a pot temperature of 230° C.: 0.3 mm. Hg. Running time was 260 minutes for 556 g. crude product.

Product:
  Viscosity _____ Y—
  Molecular weight _____ 915
  Mole ratio of E/EA _____ 1.73
  Yield, percent _____ 54
  Acid number _____ 0.8
  Color _____ 1

The compositions prepared in accordance with the foregoing examples are all liquid, generally light in color, and all being primarily useful as plasticizers for vinyl-type compositions and also useful as lubricants or lubricant additives. With regard to their use as plasticizers, there follows in Table III a summary of the performance properites of a number of the copolymers produced as described in a majority of the examples given above. In this table, the copolymers are identified by use of the example number corresponding to the number of the respective example as summarized just above and in Table II. In each case, 40 parts of the copolymer was incorporated with 60 parts of polyvinyl chloride and 1 part of Ferro 1820 stabilizer (coprecipitated barium cadmium laurate), on a weight basis, in a conventional manner for plasticizing such materials.

The test methods listed in Table III for determining the various properties of the polyvinyl chloride materials which were plasticized with the copolymers of this invention are well known. However, for those who would practice our invention and who are not familiar with those methods, a complete description thereof can be found in the publication entitled Plasticizers (Rohm & Haas Company, Philadelphia, Pennsylvania, 1954, at pages 66–70). The performance properties set forth in Table III give clear indication of the utility of the compounds of the present invention for plasticizing vinyl-type compositions.

TABLE III

Performance properties of polyvinylchloride plasticized with copolymers described in the examples

| Example | Shore "A" hardness, 10 sec. | Torsional modulus ($T_{135,000}$) °C. | 90° C. soapy water extraction, percent | Hexane extraction, percent | Activated carbon volatility, percent loss |
|---|---|---|---|---|---|
| 2 | 76 | −19½ | 5.2 | 25.2 | 3.6 |
| 3 | 82 | −1 | 8.4 | 22.9 | 4.2 |
| 4 | 76 | −6 | 6.8 | 9.8 | 3.2 |
| 5 | 79 | −4½ | 12.7 | 8.6 | 4.5 |
| 6 | 83 | −3½ | 3.9 | 4.2 | 2.0 |
| 9 | 87 | +1½ | 5.5 | 6.5 | 2.1 |
| 10 | 77 | −18 | 6.2 | 22.6 | 5.6 |
| 11 | 77 | −7 | 11.9 | 12.0 | 4.4 |
| 15 | 79 | −10½ | 4.1 | 15.9 | 1.0 |
| DOP [1] | 69 | −35 | 9 | 30 | 10 |

[1] Dioctyl phthalate, a widely used commercial plasticizer, cited here as a reference for comparison of its properties with the properties of the compositions of the present invention.

It was pointed out above that, for certain applications, the products obtained by the present invention can be given additional superior performance properties if the acidity of the resultant copolymers is kept low; for example, below an acid number of 3.0. Such materials have advantages of greater compatibility and resistance to extraction by soapy water when compared with materials having higher acid contents. This factor is of especial significance when the materials are utilized as plasticizers for polymers which are incorporated in electrical insulation and the like. In such applications, a low acid number is essential to good volume resistivity. This is illustratively indicated in Table IV which follows.

TABLE IV

[Volume resistivity (ohms-cms, $\times 10^{12}$)]

| Product of | Ex. 2 | Ex. 4 | Ex. 15 | X [1] | Commercial polyesters [2] | DOP [3] |
|---|---|---|---|---|---|---|
| 90° C. dry | 3.2 | 6.7 | 1.2 | 0.10 | About 0.1 | 1.9 |
| 60° C. wet | 7.0 | 12.8 | 1.5 | 0.42 | About 0.1 | 3.0 |

[1] X represents an ethylene ethyl acrylate copolymer (mole ratio, E/EA of 1.50; molecular weight, 743) which had an acid number of 11. It was not prepared in accordance with the present invention.
[2] Polyesters were well-known ester plasticizers from glycols and dibasic acids. They are cited for purpose of comparison with the volume resistivities of the compositions of the present invention.
[3] DOP represents dioctyl phthalate and it is also cited for purposes of comparison.

DOP is considered a good electrical grade plasticizer, but it is too fugitive. Conventional polyesters, such as polypropylene sebacates, are, on the other hand, poor in electrical properties though they have good permanence. By comparison, the compositions of the present invention are very useful because they have better permanence than DOP with equivalent or superior electrical properties if the acid numbers are low.

In summary, it may be pointed out that the improved properties of the present invention is a far more efficient method and leads to better ethylene-acrylate copolymerization products than were heretofore available. It causes a great saving in total processing time and the cost of the heat energy necessary to bring about the polymerization of the comonomers as compared with prior art methods. Most important of all is the fact that it provides for the exceptionally rapid reaction of the copolymerizable materials once they enter that part of the apparatus where the conditions for the desired copolymerization reaction are established.

The process of the present invention is much more process of the present invention is a far more efficient are simply mixed together and continuously fed in relatively small quantities into the hot coil reactor 4. There is thus eliminated the need for special equipment which can withstand the especially high pressures and temperatures that previously have been necessary when large quantities of the reactants were being mixed together while the polymerization was slowly taking place from successive portions of the comonomers.

By contrast, in the present process, although only relatively small amounts of the comonomers are subjected to the high polymerizing temperatures of the coil reactor at any one time, conditions are such that the reaction is very rapid, in some cases almost explosive in nature. This comparatively instantaneous polymerization of the comonomers, practically from the moment they are exposed to the actual polymerizing conditions which are present in the hot coil reactor, and the prompt removal of the products from the reaction conditions, minimizes the formation of any degradation or other side reaction products. A result of these conditions, which make possible this very high rate of reaction, is that substantial masses of monomers may be polymerized in a very short time. As a further consequence, the invention makes possible much higher conversions and yields than heretofore were possible to obtain.

It will be apparent that numerous other embodiments of the present invention may be made without departing from the spirit and scope thereof. Accordingly, it should be understood that the invention is not limited to the specific embodiments thereof except as defined in the following claims.

We claim:

1. A method for manufacturing liquid organic compounds having a viscosity in the range of H to $Z_5$ on the Gardner-Holdt scale, a molecular weight of between 500 and 1500, and an acid number that does not exceed 3, which comprises mixing together ethylene and a member of the class consisting of ethyl acrylate, methyl acrylate, and methyl methacrylate, controllably passing portions of the mixture into a reaction zone which is maintained under a pressure of between about 1000 to about 10,000 p.s.i. and a temperature of between about 150°–400° C., and causing the ethylene and the acrylate to copolymerize while dwelling in said heated reaction zone for a period of no less than 0.5 and no more than 30 minutes, and promptly thereafter removing the reaction products from the reaction zone.

2. The method of claim 1 in which the acrylate is ethyl acrylate.

3. The method of claim 1 in which the acrylate is methyl acrylate.

4. The method of claim 1 in which the acrylate is methyl methacrylate.

5. The method of claim 1 in which the reactants are maintained in the heated reaction zone for a period of between 2 and 20 minutes.

6. The method of claim 1 followed by distillation of the products removed from the reaction zone at about 200° C. and about 1 mm. pressure so as to strip the volatiles therefrom.

7. The method of claim 1 in which there is included in the reactants, in addition to the ethylene and acrylate, a free radical initiator in an amount up to 20 mole percent based on the total moles of monomers present.

8. The method of claim 1 in which there is included in the reactants, in addition to the ethylene and acrylate, a free radical initiator in an amount ranging from 1 to 5 mole percent based on the total moles of monomers present.

9. The method of claim 1 in which there is included in the reactants, in addition to the ethylene and acrylate, a diluent from the class consisting of cumene, hexane, methyl propionate, and methyl isobutyl ketone, said diluent being present in an amount which does not exceed 200 weight percent based on the amount of the acrylic monomer employed in the reaction, the diluent serving to moderate the reaction exotherm and impart fluidity to the reaction mixture.

10. A liquid copolymer of ethylene and a member from the class consisting of ethyl acrylate, methyl acrylate, and methyl methacrylate, said copolymer having a viscosity in the range of from H to $Z_5$ on the Gardner-Holdt scale, an acid number which does not exceed 3, a molecular weight of between about 500 and 1500, and a molar ratio of ethylene to the acrylic monomer ranging from 1 to 3 in which ratio the upper limit is a function of molecular weight as expressed by the equation:

Moles of ethylene/mole of acrylic monomer.

$$= X + \frac{1}{4}\left(\frac{1500}{\text{molecular weight}}\right)$$

where $X=1.75$ for ethyl acrylate and methyl methacrylate and $X=2.25$ for methyl acrylate.

11. A liquid copolymer of ethylene and methyl acrylate, said copolymer having a viscosity in the range of from H to $Z_5$ on the Gardner-Holdt scale, an acid number which does not exceed 3, a molecular weight of between 500 and 1500, and a molar ratio of ethylene to methyl acrylate of from 1 to 3.

12. A liquid copolymer of ethylene and methyl acrylate, said copolymer having a viscosity in the range of from H to $Z_5$ on the Gardner-Holdt scale, an acid number which does not exceed 3, a molecular weight of between 700 and 900, and a molar ratio of ethylene to methyl acrylate of from 1.7 to 2.2.

13. A liquid copolymer of ethylene and ethyl acrylate, said copolymer having a viscosity in the range of from H to $Z_5$ on the Gardner-Holdt scale, an acid number which does not exceed 3, a molecular weight of between 500 and 1500, and a molar ratio of ethylene to ethyl acrylate of from 1 to 2.5.

14. A liquid copolymer of ethylene and ethyl acrylate, said copolymer having a viscosity in the range of from H to $Z_5$ on the Gardner-Holdt scale, an acid number which does not exceed 3, a molecular weight of between 700 and 900, and a molar ratio of ethylene to ethyl acrylate of from 1.3 to 2.0.

15. A liquid copolymer of ethylene and methyl methacrylate, said copolymer having a viscosity in the range of from H to $Z_5$ on the Gardner-Holdt scale, an acid number which does not exceed 3, a molecular weight of between 500 and 1500, and a molar ratio of ethylene to methyl methacrylate of from 1.0 to 2.5.

16. A liquid copolymer of ethylene and methyl methacrylate, said copolymer having a viscosity in the range of from H to $Z_5$ on the Gardner-Holdt scale, an acid number which does not exceed 3, a molecular weight of between 500 and 800, and a molar ratio of ethylene to methyl methacrylate of from 2.0 to 2.5.

References Cited in the file of this patent

UNITED STATES PATENTS

| | | |
|---|---|---|
| 2,414,311 | Larson | Jan. 14, 1947 |
| 2,425,638 | Peterson | Aug. 12, 1947 |
| 2,436,256 | Hanford et al. | Feb. 17, 1948 |
| 2,467,234 | Sargent et al. | Apr. 12, 1949 |
| 2,782,228 | Dazzi | Feb. 19, 1957 |
| 2,833,739 | Dazzi | May 6, 1958 |
| 2,866,812 | Kirkland | Dec. 30, 1958 |
| 2,889,301 | Dazzi | June 2, 1959 |

UNITED STATES PATENT OFFICE
CERTIFICATE OF CORRECTION

Patent No. 3,089,897

May 14, 1963

Clifford E. Balmer et al.

It is hereby certified that error appears in the above numbered patent requiring correction and that the said Letters Patent should read as corrected below.

Column 10, line 69, strike out "process of the present invention is a far more efficient" and insert instead -- practical than any heretofore known, since the reactants --.

Signed and sealed this 19th day of November 1963.

(SEAL)
Attest:
ERNEST W. SWIDER
Attesting Officer

EDWIN L. REYNOLDS

Acting Commissioner of Patents